United States Patent
Kayyoor et al.

(10) Patent No.: US 11,010,492 B1
(45) Date of Patent: May 18, 2021

(54) REAL-TIME DETECTION OF PRIVACY LEAKS BASED ON LINGUISTIC FEATURES

(71) Applicant: NortonLifeLock Inc., Tempe, AZ (US)

(72) Inventors: Ashwin Kayyoor, Santa Clara, CA (US); Petros Efstathopoulos, Los Angeles, CA (US)

(73) Assignee: NortonLifeLock Inc., Tempe, AZ (US)

( * ) Notice: Subject to any disclaimer, the term of this patent is extended or adjusted under 35 U.S.C. 154(b) by 320 days.

(21) Appl. No.: 16/126,932

(22) Filed: Sep. 10, 2018

(51) Int. Cl.
*H04L 29/06* (2006.01)
*G06F 21/62* (2013.01)
*G06F 21/60* (2013.01)
*G06F 16/9535* (2019.01)
*G06F 16/2457* (2019.01)

(52) U.S. Cl.
CPC .... *G06F 21/6263* (2013.01); *G06F 16/24578* (2019.01); *G06F 16/9535* (2019.01); *G06F 21/604* (2013.01)

(58) Field of Classification Search
CPC .......................... H04L 63/102; G06F 21/6218
See application file for complete search history.

(56) References Cited

U.S. PATENT DOCUMENTS

| | | | | |
|---|---|---|---|---|
| 2008/0243825 | A1* | 10/2008 | Staddon | G16H 10/60 |
| 2009/0198488 | A1* | 8/2009 | Vigen | G06F 40/30 704/9 |
| 2011/0225129 | A1* | 9/2011 | Agrawal | G06F 16/1748 707/692 |
| 2014/0165137 | A1* | 6/2014 | Balinsky | G06F 21/554 726/1 |
| 2015/0254469 | A1* | 9/2015 | Butler | G06F 21/6218 706/12 |
| 2016/0323243 | A1* | 11/2016 | LeVasseur | G06F 21/64 |
| 2018/0337939 | A1* | 11/2018 | Agarwal | H04L 63/20 |

* cited by examiner

*Primary Examiner* — William S Powers
(74) *Attorney, Agent, or Firm* — FisherBroyles, LLP (57) ABSTRACT

Methods and systems are provided for detecting privacy leakage risks in text. One example method generally includes receiving, at a computing device from a client device, a keyword and generating, by the computing device, a combined query comprising the keyword and a sensitive topic query associated with a sensitive topic. The method further includes transmitting the keyword from the computing device to a search engine and transmitting the combined query from the computing device to the search engine. The method further includes receiving, at the computing device from the search engine, a number of search results for the keyword and receiving, at the computing device from the search engine, a number of search results for the combined query. The method further includes determining, by the computing device, a confidence score and transmitting the confidence score from the computing device to the client device.

20 Claims, 6 Drawing Sheets

REAL-TIME DETECTION OF PRIVACY LEAKS BASED ON LINGUISTIC FEATURES

BACKGROUND

Field

Embodiments of the present invention generally relate to evaluating textual input, and more particularly to detecting potential leaks of private information in textual input.

Description of the Related Art

When writing a message, the author of the message may use words that inadvertently reveal more personal information than intended. For example, while writing an email, a user may use words that appear innocuous but in fact may be quite telling. Such mistakes can be more than merely embarrassing, as revealing personal information may expose users to cyber attacks. Additionally, certain personal information, such as medical information, is in many locations prohibited from being released. While someone knowing this information may be able to avoid literal releases of information, inadvertent releases can occur due to the use of certain words. For example, the term "gp120" refers to a protein associated with HIV. Use of the term "gp120" may reveal just as much medical information as the word "HIV" itself does, and should be used with caution or avoided. As a result, systems and methods are needed that can automatically detect potential privacy leaks in text.

SUMMARY

Embodiments of the present disclosure generally relate to detecting potential privacy leaks in text using linguistic features.

One embodiment of the present disclosure provides a method for detecting privacy leaks performed by a computing device including at least a processor. The method generally includes receiving, at the computing device from a client device, a keyword and generating, by the computing device, a combined query comprising the keyword and a sensitive topic query associated with a sensitive topic. The method further includes transmitting the keyword from the computing device to a search engine and transmitting the combined query from the computing device to the search engine. The method further includes receiving, at the computing device from the search engine, a number of search results found by the search engine for the keyword and receiving, at the computing device from the search engine, a number of search results found by the search engine for the combined query. The method further includes determining, by the computing device, a confidence score indicating a probability that the keyword would leak information associated with the sensitive topic based on the numbers of search results for the keyword and for the combined query and transmitting the confidence score from the computing device to the client device.

Another embodiment of the present disclosure is a computing device. The computing device includes a processor and a memory coupled to the processor. The memory has instructions stored thereon which, when executed by the processor, perform operations for detecting privacy leaks. The operations generally include receiving, at the computing device from a client device, a keyword and generating, by the computing device, a combined query comprising the keyword and a sensitive topic query associated with a sensitive topic. The operations further include transmitting the keyword from the computing device to a search engine and transmitting the combined query from the computing device to the search engine. The operations further include receiving, at the computing device from the search engine, a number of search results found by the search engine for the keyword and receiving, at the computing device from the search engine, a number of search results found by the search engine for the combined query. The operations further include determining, by the computing device, a confidence score indicating a probability that the keyword would leak information associated with the sensitive topic based on the numbers of search results for the keyword and for the combined query and transmitting the confidence score from the computing device to the client device.

Yet another embodiment of the present disclosure is a non-transitory computer-readable medium having instructions, which when executed by at least one processor of a computing device, cause the processor to perform operations for detecting privacy leaks. The operations generally include receiving, at the computing device from a client device, a keyword; generating, by the computing device, a combined query comprising the keyword and a sensitive topic query associated with a sensitive topic; transmitting the keyword from the computing device to a search engine; transmitting the combined query from the computing device to the search engine; receiving, at the computing device from the search engine, a number of search results found by the search engine for the keyword; receiving, at the computing device from the search engine, a number of search results found by the search engine for the combined query; determining, by the computing device, a confidence score indicating a probability that the keyword would leak information associated with the sensitive topic based on the numbers of search results for the keyword and for the combined query; and transmitting the confidence score from the computing device to the client device.

Still another embodiment of the present disclosure provides a method for displaying privacy leak information, performed by a computing device including at least a processor. The method generally includes displaying, on a display device of the computing device, a user interface (UI) capable of receiving text from an input device associated with the computing device and receiving, through the UI, text including a plurality of words. The method further includes identifying, by the computing device, a keyword among the plurality of words and transmitting, from the computing device to a server, the keyword. The method further includes receiving, at the computing device from the server, a confidence score associated with the keyword and a replacement word for the keyword and updating the UI to include the confidence score and the replacement word.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of the present disclosure's scope, as the present disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure describes methods and apparatus for automatically identifying words that potentially leak private information about the author of the words. However, such automation may only be possible with a suitable corpus of words. Further, even when a suitable corpus can be found, automation of detecting privacy risks can be limited by the types of associations that can be made in language processing. Typically, associations can be found between two words, but finding an association between a topic (e.g., a concept expressible by many alternative words or combinations of words) and a particular word is more difficult.

In order to effectively automate the detecting of privacy risks in textual input, the Internet can be used as a corpus for word analysis. In particular web sites (or web pages) indexed by a search engine can be used as a corpus. To determine an association between a particular word and a sensitive topic, the number of results returned by a search engine for the sensitive topic and for the particular word can be used to represent the frequency of occurrence of the particular word and the sensitive topic in the corpus. Based on the idea that words that frequently co-occur in a corpus tend to be related words, by using the number of results returned by the search engine, an estimate of the association between the particular word and the sensitive topic can be determined In practice, this idea can be used to analyze textual input by a user of a computing device to determine if the user's choice of words may lead to disclosure of sensitive or personal data of the user. For example, an email composed by the user can be analyzed to determine the meaningful words (or keywords) of the email, and these meaningful words can be used to create various search engine queries. By comparing the number of search results for a query including only a keyword and the number of search results for a combined query including the keyword and one or more words representing a sensitive topic, it can be determined if there is a high likelihood of association between the keyword and the sensitive topic. In general the likelihood of association between the keyword and the sensitive topic is higher when the keyword appears frequently alongside the sensitive topic.

For example, if a user writes a sentence including the word "Ganesha," a query including "Ganesha" and a query combining "Ganesha" and words related to religious beliefs may be created and sent to a search engine. A comparison of the number of results of the two queries is likely to indicate that there is a high likelihood of association between "Ganesha" and religious beliefs of the user. Thus, using the word "Ganesha" in a sentence is likely to reveal personal information about the user's religious beliefs. By so identifying such words, the user (or in some cases, the application) may be able to revise the written sentence to reduce the inadvertent revelation of the user's personal information. Because personal information is frequently used in cyber attacks, reducing the amount of personal information a user reveals may also reduce that user's exposure to cyber attacks.

Figure 1:
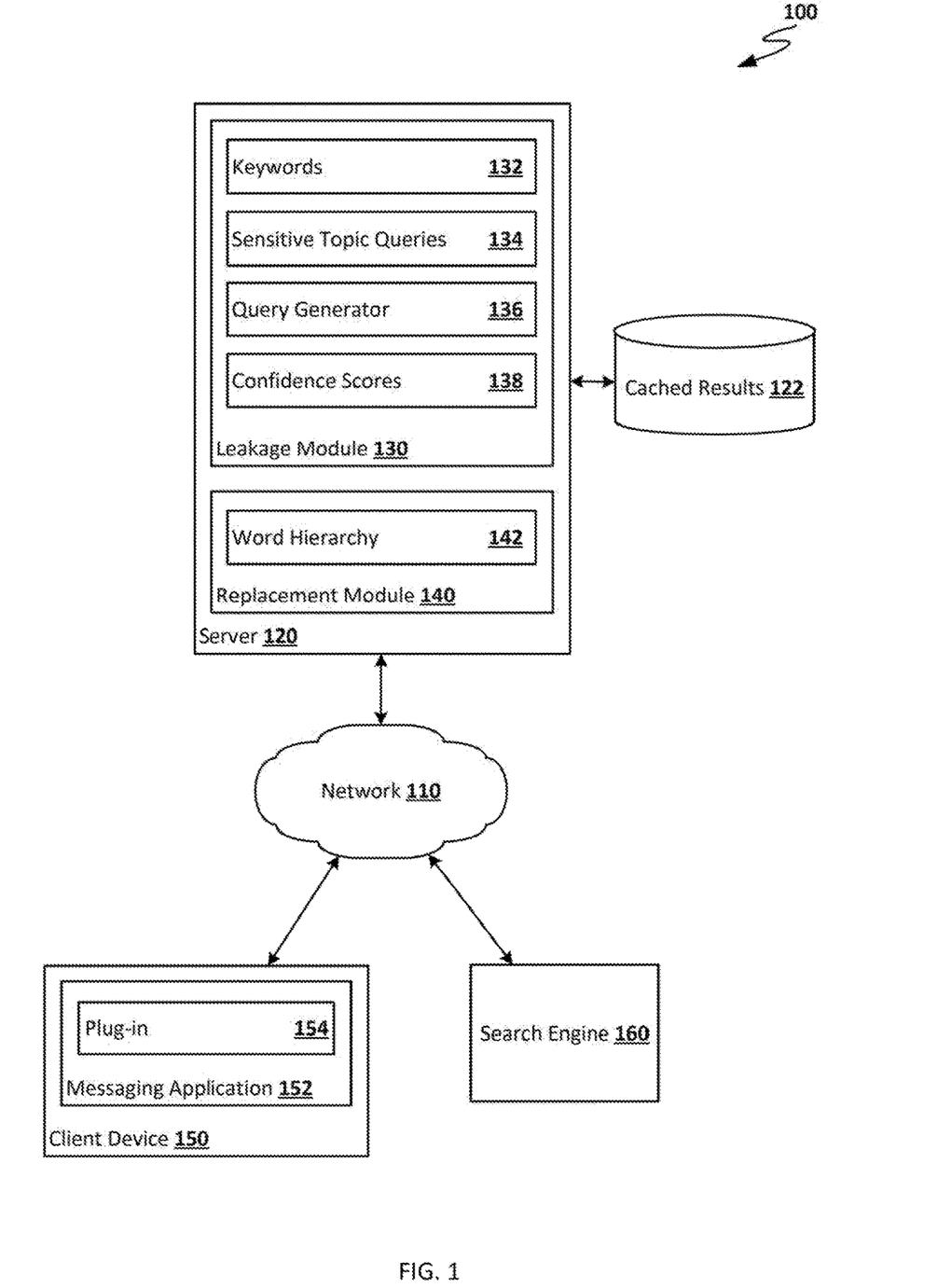
FIG. 1 is a block diagram of an example computing environment in which systems of the present disclosure may operate, according to an embodiment of the present disclosure.

FIG. 1 is a block diagram of an example computing environment 100 in which systems of the present disclosure may operate, according to an embodiment of the present disclosure. Computing environment 100 includes server 120, client device 150, and search engine 160, all connected via network 110.

Server 120 is a computing device (e.g., within a cloud computing system) including at least a processor, memory, and a network interface. Server 120 further includes leakage module 130 and replacement module 140. Server 120 can be used to identify potential privacy leaks in user messages and highlight those privacy leaks to the user. Although shown as a single computing device, in other examples the functions of server 120 may be performed by multiple computing devices or by a distributed computing system or cloud computing system. Server 120 is linked to a database of cached results 122. In other examples, the contents of cached results database 122 may be stored on a storage device internal to server 120 or available to server 120 over network 110.

Leakage module 130 is a software routine executing on server 120. Leakage module 130 analyzes user messages to determine possible privacy leaks in the user messages. Leakage module 130 includes keywords 132, sensitive topic queries 134, query generator 136, and confidence scores 138.

Keywords 132 are words, phrases, or other textual terms analyzed by leakage module 130 for evaluating a risk that the words, phrases, or other terms would reveal personal or private information of a user if used in a message or other text-based communication. In this example, keywords 132 are received from plug-in 154 executing within messaging application 152 on client device 150, but in general any words, phrases, or other terms may be analyzed by leakage module 130 for privacy risks.

Sensitive topic queries 134 are a plurality of queries formatted for use in a search engine that represent a given sensitive or private topic. Such sensitive or private topics are numerous, but may include, for example, the age of a user, the health of the user, religious beliefs of the user, political ideology of the user, sexual orientation of the user, ethnic origin of the user, moral beliefs of the user, criminal profile of the user, martial status of the user, emotional characteristics of the user, or financial status of the user. Formatting a query for use in a search engine may include the use of various logical operators (e.g., OR, AND, or NOT) to create a well-formatted query. For example, a query for the topic "age" may be "("young" OR "old" OR "adolescent" OR "teen") AND "age." In general, sensitive topic queries 134 may be logically combined with the keyword and transmitted to search engine 160 in order determine a number of search results associated with the combined query.

Query generator 136 is a software routine or sub-routine executing as part of leakage module 130. Query generator 136 is used to generate sensitive topic queries 134. Based on a language analysis, query generator 136 can determine words or phrases related to a given topic (e.g., "young" or "old" may be determined to be related to the topic "age"). Query generator 136 can then format the determined words into the proper format for use with a search engine, such as by adding logical operators (e.g., OR, XOR, AND) or logical separators (e.g., brackets). In other examples, sensitive topic queries 134 may instead be created by an operator of server 120.

Confidence scores 138 are a plurality of scores relating a confidence that a given word or phrase is related to a particular sensitive topic. In general, leakage module 130 generates confidence scores 138 based on a calculation using the numbers of results from search engine 160 with respect to a particular keyword of keywords 132 and to a related combined query.

Figure 4:
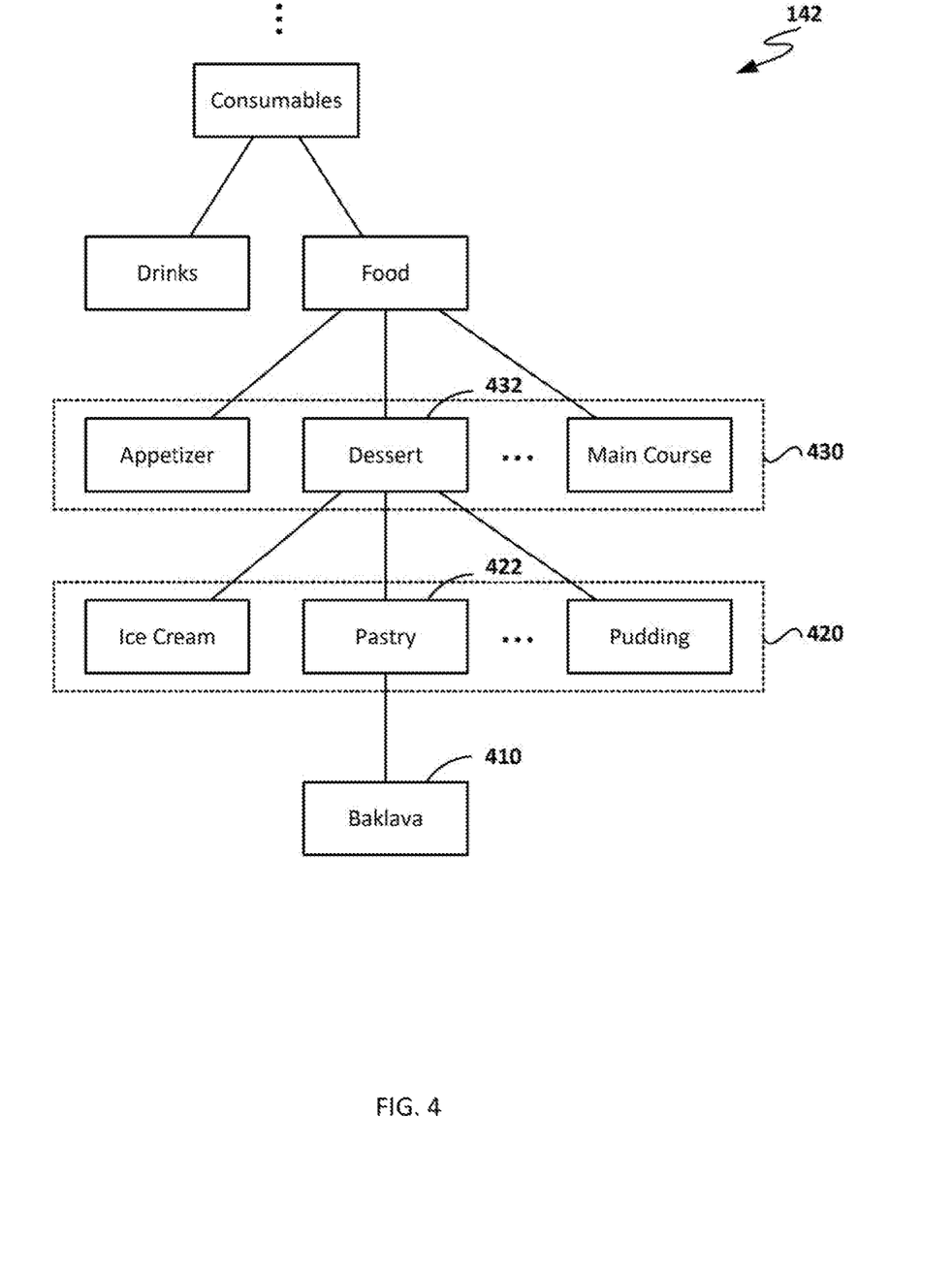
FIG. 4 is an illustration of an example word hierarchy for use in suggesting replacement words, according to an embodiment of the present disclosure.

Optional replacement module 140 is a software routine executing on server 120. Replacement module 140 analyzes words, such as keywords 132, to identify a replacement word, phrase, or other textual term that is less likely to reveal private information. Replacement module 140 includes word hierarchy 142. Word hierarchy 142 is a tree-based or otherwise hierarchical data structure storing a description of words and related words. In general, word hierarchy 142 can be used to identify a more generalized replacement for a particular word that can be substituted without changing the meaning of a sentence. An illustration of an example word hierarchy is shown in FIG. 4 as described below.

Client device 150 is a computing device operated by a user that includes a processor, a memory, and a display device. Client device 150 includes messaging application 152. Messaging application 152 is a software application executing on client device 150 that can be used to transmit messages, such as an email application, an instant message application, or a chat application.

Messaging application 152 includes plug-in 154. Plug-in 154 is a software routine or a client application of server 120, which can examine text entered into messaging application 152, make transmissions to server 120, and receive transmissions from server 120. Plug-in 154 is designed to parse text entered by a user in real time and transmit the text to server 120 for analysis of potential privacy leaks. Plug-in 154 performs sentence analysis to identify keywords within the entered text. For example, plug-in 154 may identify proper nouns or verbs, which may be more likely to convey information than other words. Plug-in 154 may be configured to operate within a particular messaging application (e.g., an email client). In other examples, plug-in 154 may be configured to operate within other types of applications that receive text from users, such as word processing applications.

Search engine 160 is a server or cluster of servers providing a web search service to users. Search engine 160 may be a third-party search engine such as GOOGLE®, BING®, etc. In general, text queries are submitted to search engine 160, and links to web pages related to the text queries are returned in response. Responses from search engine 160 also include a number of results corresponding to the number of unique web pages found to be relevant by search engine 160.

In one example method of detecting privacy leaks using linguistic features, the user of client device 150 enters text into messaging application 152 (e.g., the user composes an email). Plug-in 154 may analyze the text as the text is entered to identify keywords. Plug-in 154 may then transmit the keywords to server 120 for analysis.

Server 120 may receive the keywords from plug-in 154 over network 110 and store the keywords as keywords 132. Leakage module 130 may then determine if keywords 132 correspond to a previous analysis performed by server 120 and stored in cached results database 122. If no previous analysis is available, leakage module 130 submits queries to search engine 160 in order to compare the number of results for keywords 132 with the number of results for a conjunction of keywords 132 and sensitive topic queries 134. Based on this comparison, leakage module 130 generates confidence scores 138. Confidence scores 138 may then be transmitted to plug-in 154 by server 120 and thereafter displayed to the user on the display device of client device 150.

In other examples, after leakage module 130 generates confidence scores 138, replacement module 140 may determine if the confidence score for a particular keyword and combined query fails to meet a replacement threshold. If so, replacement module 140 uses word hierarchy 142 to identify a replacement word for the keyword. Server 120 may then transmit the replacement word to plug-in 154 for display to the user of client device 150.

Figure 2:
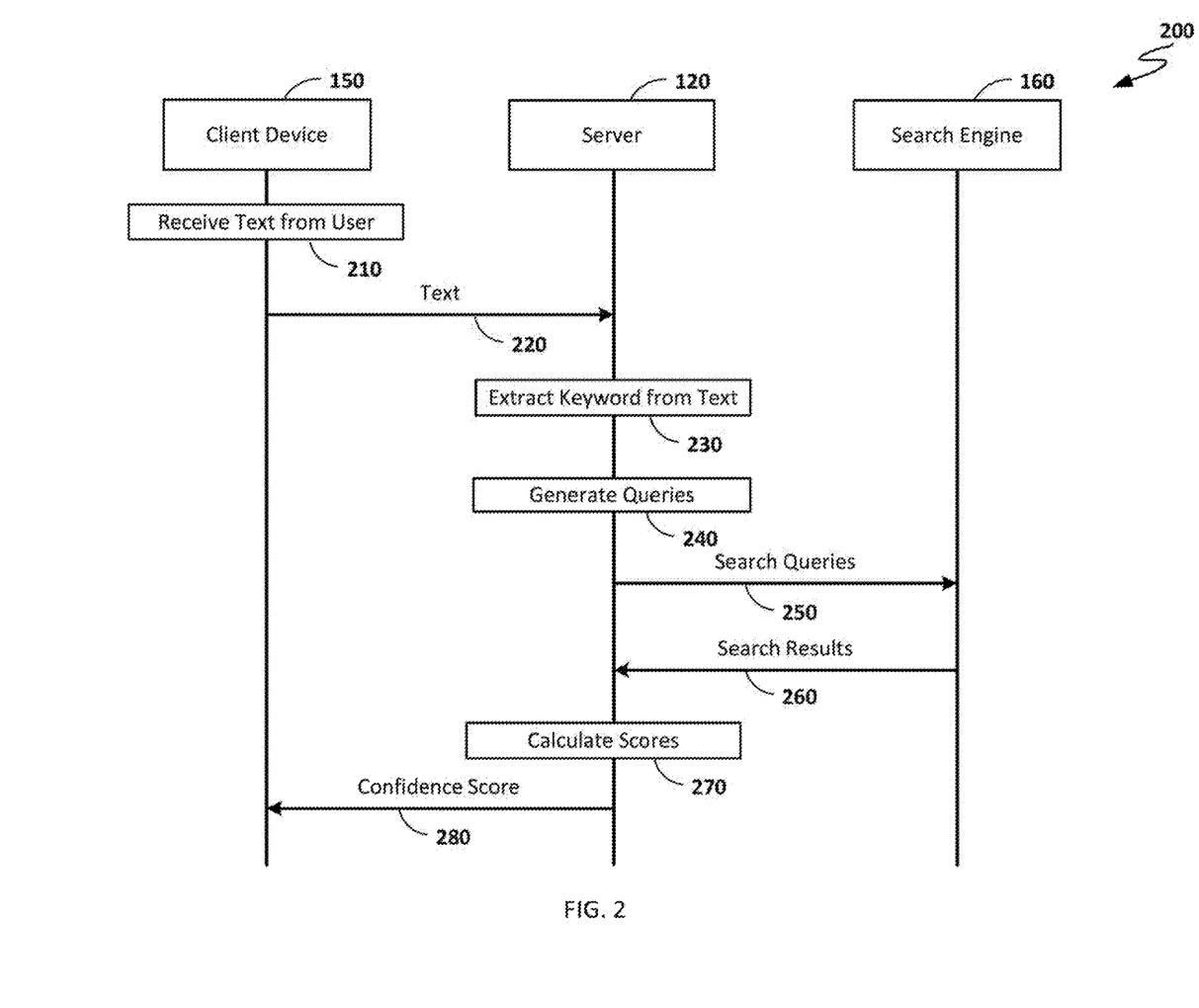
FIG. 2 is a call-flow diagram of an example method for detecting privacy leaks using linguistic features, according to an embodiment of the present disclosure.

FIG. 2 is a call-flow diagram of an example method 200 for detecting privacy leaks using linguistic features. Method 200 involves client device 150, server 120, and search engine 160. Method 200 begins at block 210, where client device 150 receives text from a user through an email application including a privacy leakage plug-in, such as plug-in 154 of FIG. 1. Because the text is received through the email application in this example, the text may be taken from a drafted email to be eventually transmitted from the client device to a different client device (to be read by a different person). As a result, if the text includes words that would reveal personal or private information of the user, transmission of the text may expose the user to cyber attacks.

At transmission 220, client device 150 sends the text received from the user to server 120 for analysis of potential privacy leakage. As shown with respect to FIG. 1, transmission 220 may be over a network connection, such as via network 110 of FIG. 1. At block 230, server 120 extracts keyword from the text. Server 120 may perform sentence analysis of the text in order to identify significant words within the text, which are more likely to carry personal information. For example, the sentence "I eat baklava" includes three words, but only the word "baklava" likely carries any personal information of the user. Using a corpus of identified words (e.g., words that have been identified as a verb, noun, etc.), server 120 identifies a significant word (e.g., a noun or a verb) within the text, and designates the significant word as a keyword. In this example, server 120 identifies a single keyword; however, in execution there may be many keywords identified within the text. Further, although shown as performed by server 120, in other examples client device 150 may extract keywords from the text before transmission to server 120, rather than transmitting the entirety of the text to server 120.

At block 240, server 120 generates queries based on the keyword extracted at block 230. The queries are search engine queries that are used to determine the number of search results returned by the search engine for each query. In general, for each sensitive topic, server 120 generates two queries, a keyword query and a combined query of the keyword combined with a sensitive topic query, as discussed above with respect to FIG. 1. Calculations based on the numbers of results for the two queries can be used to estimate an association between the keyword and a sensitive topic. As discussed, there may be a sensitive topic query for each sensitive topic covered by server 120.

For example, if the keyword extracted from the text is "baklava," server 120 may generate a combined query with the word "baklava" and the sensitive topic query for the topic "health." The sensitive topic query for the topic "health" may include multiple words along with logical operators intended to return results from search engine 160 that cover that topic. For example, words related to "health" (and thus that may be included in a query to return results for health) include "mental," "physical," and "health" itself. Using these words, the sensitive topic query for the topic "health" may be "('mental' OR 'physical' OR 'health') AND 'health.'"

The keyword extracted from the text may be logically appended to the sensitive topic query to generate a combined query. Thus, the combined query for comparing the keyword to the sensitive topic may be "(('mental' OR 'physical' OR 'health') AND 'health') AND 'baklava.'" In addition to this combined query, server 120 also generates a keyword query, which in this case includes only the word "baklava." This example specifies one keyword and one sensitive topic, but in order to produce a complete analysis, a combined query may be generated for every sensitive topic query stored by server 120 (or a subset thereof). Thus, a given keyword is analyzed for relevance to every sensitive topic analyzed by server 120 (or a subset thereof).

Once the keyword query and the combined query are generated, at transmission 250 server 120 transmits the keyword query and combined query to search engine 160. Search engine 160 processes the queries (e.g., performs a web search based on the queries) and returns the result of those queries to server 120 at transmission 260 as search results. In general, the search results may include links to web pages that match the queries and/or an indication of the numbers of results of the queries.

At block 270, server 120 calculates confidence scores for the keyword based on the numbers of results of the queries. Confidence scores may be calculated based on an assumption about the relevance about the contents of the queries transmitted to search engine 160. This is based on the conditional probability of a leak. For example, given a keyword W and a sensitive topic P, The probability of the information of P leaking when W is included in a sentence can be expressed as Pr(P|W).

The conditional probability of W leaking P can be estimated based on the frequency of P and W occurring together in a corpus over the frequency of W appearing on its own in the corpus. Given a function $fr(\ )$ which returns the frequency of a word, Pr(P|W) can thus be expressed as $$\frac{fr(P \wedge W)}{fr(W)}.$$

In the methods discussed herein, the corpus used to estimate Pr(P|W) is the Internet, which in this case is examined as web pages on the Internet indexed by search engines. Thus, given a function $Nr(\ )$ which returns the number of results for a given web query, Pr(P|W) can be estimated as $$\frac{Nr(P \text{ AND } W)}{Nr(W)},$$

where Nr(PAND W) is the number of results for the combined query and Nr(W) is the number of results for the keyword query.

Using the expression $$\frac{Nr(P \text{ AND } W)}{Nr(W)}$$

server 120 can calculate a confidence score that the keyword (W) reveals private information about the sensitive topic (P). Once the confidence scores for each sensitive topic are determined, server 120 may sort the confidence scores in order to identify the highest confidence scores (such as the top three) for the keyword. In the example of the keyword "baklava," the three highest confidence scores may be for the topics "ethnic origin," "emotional characteristics," and "health."

After the confidence scores are determined, server 120 transmits the confidence scores to client device 150 at transmission 280. After receipt of transmission 280, client device 150 may display the confidence scores to user, and may allow the user to change the keyword after presentation. In some examples, client device 150 may provide the user with a recommended replacement word for the keyword.

Figure 3:
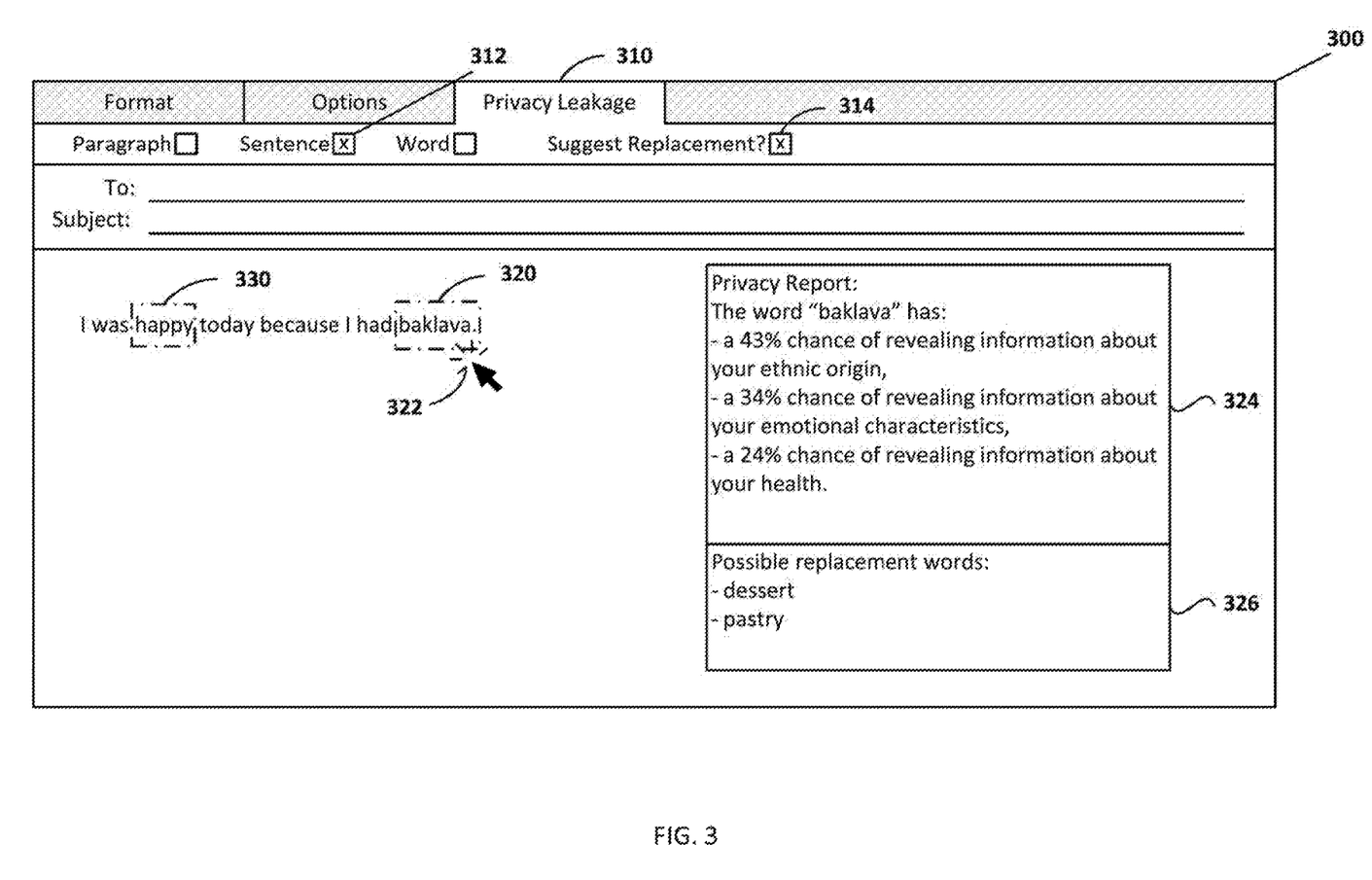
FIG. 3 illustrates an example user interface for entering textual information and conveying the detection of potential privacy leaks using linguistic features, according to an embodiment of the present disclosure.

FIG. 3 illustrates an example user interface (UI) 300 for entering textual information and conveying the detection of privacy leaks using linguistic features, according to an embodiment of the present disclosure. UI 300 may be displayed on a display device (such as a screen) of a computing device, such as a desktop computer, laptop, tablet, or smartphone. UI 300 shows the execution of a privacy leakage plug-in (such as plug-in 154 of FIG. 1) operating within an email client. The selection of the privacy leakage plug-in is shown at 310. The selection at 310 displays various options of the privacy leakage plug-in, including what level the text entered into UI 300 is analyzed at (paragraph, sentence, or word) and whether the privacy plug-in should suggest replacement words for words deemed to be present a privacy risk. As shown at 312 and 314, the user of the email client has selected analysis at a sentence level and for replacement words to be suggested by the privacy leakage plug-in.

UI 300 allows the user to enter text into UI 300 using an input device. An input device may be a keyboard for some computing devices (such as a laptop or desktop computer) while an input device may be a touchscreen for other computing devices (such as a smartphone or tablet). After or as the user enters text into UI 300, the privacy leakage plug-in analyzes the text. Generally, to perform analysis of words, the privacy leakage plug-in transmits identified keywords to a server for processing and afterwards receives confidence scores for the transmitted keywords. In this example, because the user has selected sentence-level analysis, the privacy leakage plug-in waits for an entire sentence to be entered before prompting the user with information.

In this case, after the user has entered the sentence "I was happy today because I had baklava," the privacy leakage plug-in identifies two keywords that may leak sensitive information: "happy" as shown at 330 and "baklava" as shown at 320. UI 300 includes a highlighting of "happy" and "baklava" to draw the user's attention to the keywords. In this example a dotted box is shown around the keywords to highlight the keywords, but in other examples, other methods may be used, such as color-coding the keywords.

UI 300 also allows the user to select one of the keywords to display a privacy report for the keyword. Selection may be done using different input devices depending on the type of computing device. For example, a desktop computer may use input from a mouse to select UI objects, while a smartphone may use touchscreen input to select UI objects. When the user selects one of the keywords, as shown at 322, information related to the keyword may be presented by the privacy leakage plug-in. In this example, the user has clicked on "baklava" so the privacy leakage plug-in presents two information boxes, 324 and 326, to the user. Box 324 shows a privacy report for "baklava" that relays confidence scores of "baklava" to the user, while box 326 shows potential replacements for the word "baklava" that are less likely to reveal personal information. Box 326 may further allow a user to select a replacement word, and if selected, to replace the corresponding keyword with the replacement word.

FIG. 4 illustrates an example word hierarchy 142 for use in suggesting replacement words. Word hierarchy 142 is a simplified example of the contents of an actual word hierarchy and what is shown is limited to a section of a full word hierarchy. In particular, word hierarchy 142 shows the word "baklava" at 410 and words and phrases immediately above "baklava" in the word hierarchy.

Word hierarchy 142 is divided into levels of related words. Level 420, the level immediately above "baklava" shows three words, but there may be a plurality of other words at level 420. In this example all words at level 420 are types of desserts. At 422 the word "pastry" is shown as the parent word for "baklava" 410. That is, "pastry" is a more generalized way to express the meaning of the term "baklava." The word "pastry" conveys less information than "baklava" and so may be less likely to convey sensitive information.

Level 430 also shows three words. The words of level 430 relate to different kinds of food. Level 430 includes "dessert" 432, which is the parent word for "pastry" 422. Like the relationship between "baklava" and "pastry," "dessert" conveys less information than "pastry" and so may be even less likely to convey sensitive information. When using word hierarchy 142, a replacement module, such as replacement module 140 of FIG. 1, may take parent words from one or more levels up to recommend to a user as a replacement. In this example, the replacement module may recommend the use of the words "pastry" or "dessert" as substitutes for "baklava."

Figure 5:
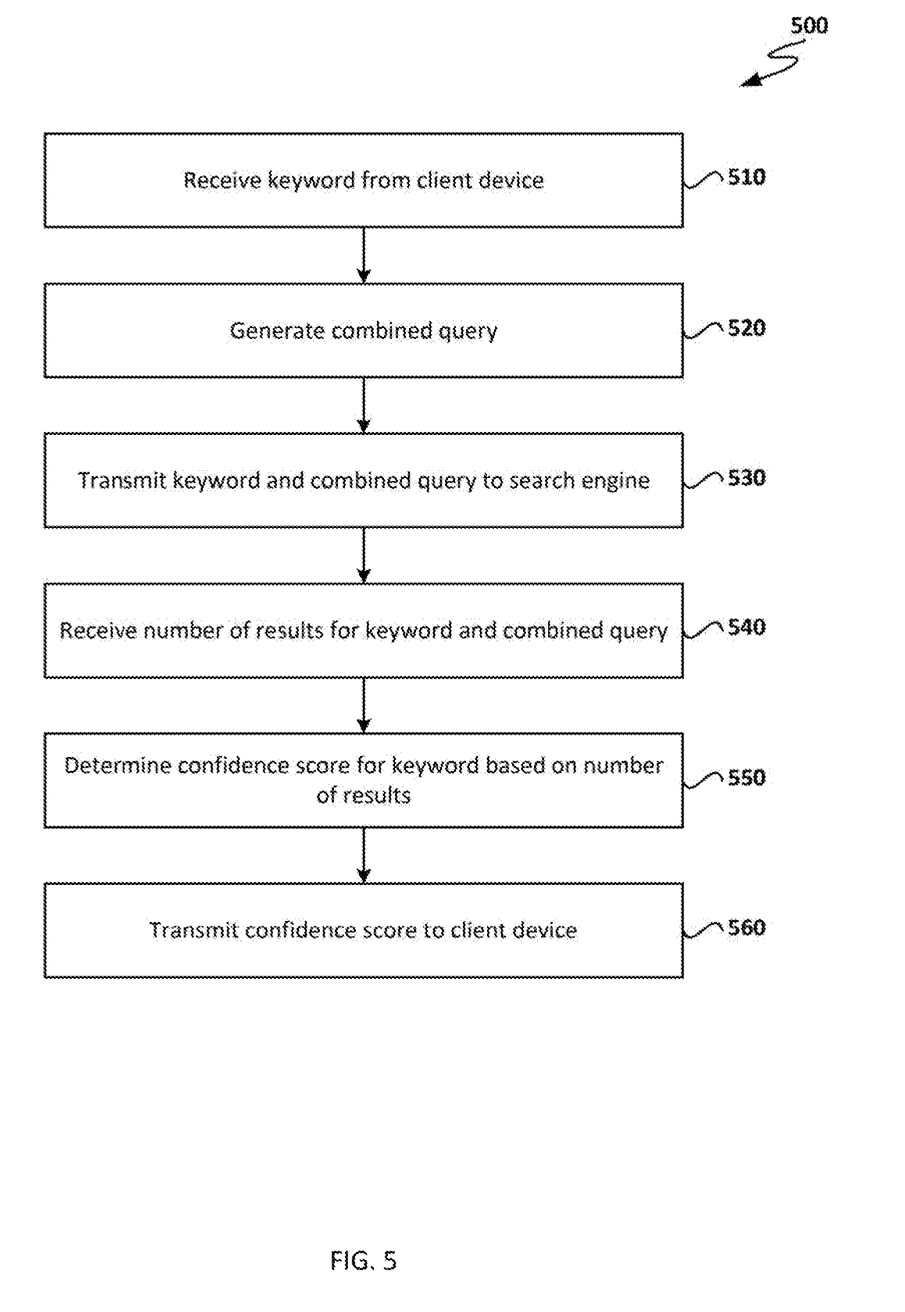
FIG. 5 is a flow diagram of an example process for detecting privacy leaks, according to an embodiment of the present disclosure.

FIG. 5 is a flow diagram of an example process 500 for detecting privacy risks, according to an embodiment of the present disclosure. Process 500 may be performed by a server executing a leakage module, such as server 120 of FIG. 1. Process 500 begins at operation 510, where the server receives a keyword from a client device over a network. The keyword may have been previously identified by a privacy leakage plug-in executing within an email client of the client device. In some examples, the server checks if a cached result exists for the keyword. If a cached result is found, the server may access previously determined confidence scores for the keyword from the cached result. Generally, the server checks a stored repository or database of previously analyzed words to determine if the keyword has previously been analyzed. If the keyword has previously been analyzed that analysis may be re-used. However, a previous analysis may be determined to be out of date and/or may have been removed from storage as a part of routine maintenance. In such a case, the keyword may be re-analyzed despite the previous analysis.

At operation 520, the server generates a combined query, which includes both the keyword received at 510 and a sensitive topic query. The sensitive topic query may have been previously generated in order to return results from a search engine related to a sensitive topic associated with the sensitive topic query. The combined query may be generated by appending, by use of the logical operator "AND," the keyword to the sensitive topic query.

At operation 530, the server transmits the combined query and the keyword query to an external, third-party search engine. Use of the search engine allows the server to treat the web pages indexed by the search engine as a corpus for the purposes of word analysis. Use of such a large corpus may improve the results obtained from the word analysis. At operation 540, the server receives a number of results for the keyword by itself and for the combined query from the search engine. Because the combined query is a more specific search, it may most likely return a lower number of results than the keyword query alone.

At operation 550, the server determines a confidence score for the keyword based on the number of results for the keyword query and the number of results for the combined query. As discussed above with respect to FIG. 2, a confidence score may be obtained by estimating the conditional probability of the sensitive topic leaking based on the presence of the keyword. Using the numbers of results as the values for the frequencies of the keyword and the combined query in the corpus, a confidence score for the keyword that indicates the probability of the sensitive topic leaking based on the presence of the keyword can be determined.

At operation 560, the server transmits the confidence score for the keyword to the client device, as a response to the initial receipt of the keyword. Again, like operation 510, this transmission may be from the server to the privacy leakage plug-in. The privacy leakage plug-in may thereafter use the confidence score to display information related to privacy leakage to the user.

Figure 6:
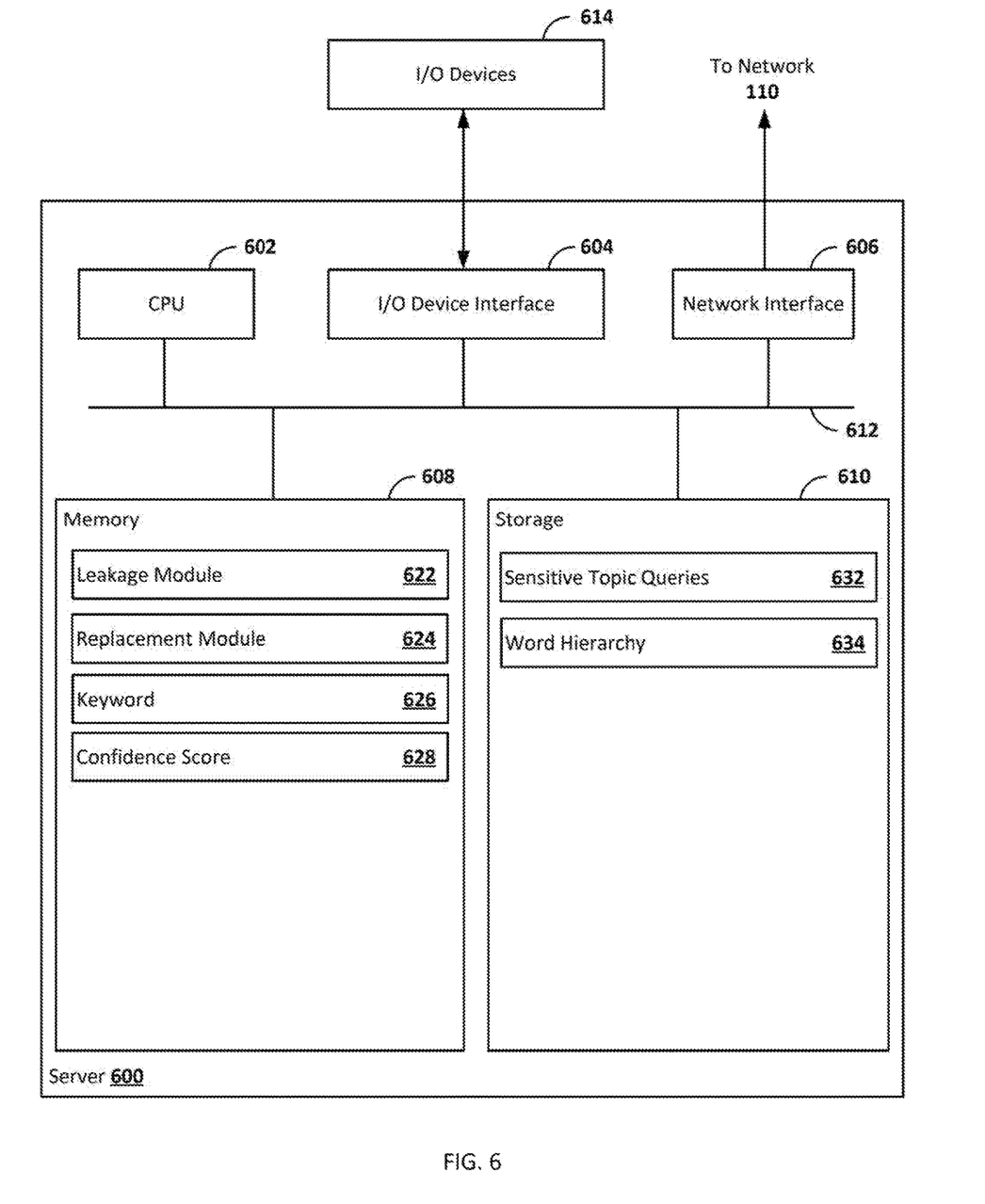
FIG. 6 is a block diagram of an example server, according to an embodiment of the present disclosure.

FIG. 6 is a block diagram of an example server 600, according to an embodiment of the present disclosure. As shown, the server 600 includes, without limitation, central processing unit (CPU) 602, one or more input/output (I/O) device interfaces 604, which may allow for the connection of various I/O devices 614 (e.g., keyboards, displays, mouse devices, pen input, etc.) to the server 600, network interface 606, memory 608, storage 610, and interconnect 612.

CPU 602 may retrieve and execute programming instructions stored in the memory 608. Similarly, CPU 602 may retrieve and store application data residing in memory 608. Interconnect 612 transmits programming instructions and application data, among CPU 602, I/O device interface 604, network interface 606, memory 608, and storage 610. CPU 602 is included to be representative of a single CPU, multiple CPUs, a single CPU having multiple processing cores, and the like. I/O device interface 604 may provide an interface for capturing data from one or more input devices integrated into or connected to server 600, such as keyboards, mice, touchscreens, and so on. Memory 608 may represent a random access memory (RAM), while storage 610 may be a solid state drive, for example. Although shown as a single unit, storage 610 may be a combination of fixed and/or removable storage devices, such as fixed drives, removable memory cards, network attached storage (NAS), or cloud-based storage.

As shown, memory 608 includes leakage module 622, replacement module 624, keyword 626 and confidence score 628. Leakage module 622 and replacement module 624 may both be software routines executed based on instructions stored in storage 610. Such instructions may be executed by the CPU 602. Keyword 626 and confidence score 628 may be data temporarily resident in memory 608.

As shown, storage 610 includes sensitive topic queries 632 and word hierarchy 634. Sensitive topic queries 632 and word hierarchy 634 may be used by leakage module 622 and replacement module 624 to perform a method for detecting privacy leaks. In particular, leakage module 622 may use keyword 626 and sensitive topic queries 632 to create a combined query, which is then transmitted to a search engine via network interface 606. The number of results returned from the combined query can be used by leakage module 622 to determine confidence score 628. Based on confidence score 628, replacement module 624 may determine a replacement word for keyword 626 using word hierarchy 634. Thereafter both the replacement word and confidence score 628 may be transmitted to a client device via network interface 606.

One embodiment of the present disclosure provides a method for detecting privacy leaks, the method being performed by at least one computing device having at least one processor. The method generally includes receiving, at the computing device from a client device, a keyword; generating, by the computing device, a combined query comprising the keyword and a sensitive topic query associated with a sensitive topic; transmitting the keyword from the computing device to a search engine; transmitting the combined query from the computing device to the search engine; receiving, at the computing device from the search engine, a number of search results found by the search engine for the keyword; receiving, at the computing device from the search engine, a number of search results found by the search engine for the combined query; determining, by the computing device, a confidence score indicating a probability that the keyword would leak information associated with the sensitive topic based on the numbers of search results for the keyword and for the combined query; and transmitting the confidence score from the computing device to the client device.

According to some embodiments, the method further includes, when the confidence score meets or exceeds a predetermined threshold, performing a security action to prevent a leak of the information associated with the sensitive topic.

According to some embodiments, the security action comprises one or more of: transmitting, to the client device, an indication to remove the keyword from text entered into the client device; transmitting, to the client device, an indication to prevent the keyword from being entered into subsequent text on the client device; or transmitting, to the client device, an indication to display a warning about the keyword on the client device.

According to some embodiments, the method further includes determining, by the computing device based on a word hierarchy, a replacement word for the keyword; and transmitting, from the computing device to the client device, the replacement word.

According to some embodiments, determining the replacement word comprises: identifying the keyword in the word hierarchy; locating a parent word of the keyword in the word hierarchy, the parent word being at a different level in the word hierarchy than the keyword; and selecting the parent word as the replacement word.

According to some embodiments, the method further includes prior to transmitting the keyword and transmitting the combined query to the search engine, determining, by the computing device, whether a cached results database includes a cached result for the keyword.

According to some embodiments, the method further includes transmitting the cached result for the keyword from the computing device to the client device if the cached results database includes the cached result for the keyword.

According to some embodiments, the keyword from the client device comprises receiving the keyword from a privacy leakage plug-in executing within an email client of the client device.

According to some embodiments, the sensitive topic query was generated to return search results from the search engine for the sensitive topic.

According to some embodiments, the method further includes generating, by the computing device, one or more additional combined queries, each additional combined query comprising the keyword and an additional sensitive topic query associated with an additional sensitive topic; transmitting the additional combined queries from the computing device to the search engine; receiving, at the computing device from the search engine, a number of additional search results found by the search engine for the additional combined queries; determining, by the computing device, one or more additional confidence scores indicating one or more probabilities that the keyword would leak additional information associated with the one or more additional sensitive topics; ranking, by the computing device, the additional confidence scores to generate a tuple of relevant topics; and transmitting the tuple of relevant topics from the computing device to the client device.

One embodiment of the present disclosure provides a method for displaying privacy leak information, the method being performed by at least one computing device having at least one processor. The method generally includes displaying, on a display device of the computing device, a user interface (UI) capable of receiving text from an input device associated with the computing device; receiving, through the UI, text including a plurality of words; identifying, by the computing device, a keyword among the plurality of words; transmitting, from the computing device to a server, the keyword; receiving, at the computing device from the server, a confidence score associated with the keyword and a replacement word for the keyword; and updating the UI to include the confidence score and the replacement word.

According to some embodiments, the method for displaying privacy leak information further includes, when the confidence score meets or exceeds a predetermined threshold, performing a security action to prevent a leak of the information associated with the sensitive topic.

According to some embodiments of the method for displaying privacy leak information, the security action comprises one or more of: removing the keyword from the text; preventing the keyword from being entered into subsequent text; or displaying a warning about the keyword.

According to some embodiments, the method for displaying privacy leak information further includes receiving, through the UI, a selection of the replacement word; and replacing, in the UI, the keyword with the replacement word in the text.

According to some embodiments, the method for displaying privacy leak information further includes displaying, in the UI, an indication that the keyword potentially leaks sensitive information.

According to some embodiments of the method for displaying privacy leak information, the indication that the keyword potentially leaks sensitive information includes a color-coding of the keyword in the UI.

According to some embodiments, the method for displaying privacy leak information further includes prior to updating the UI to include the confidence score and the replacement word, receiving a selection of the keyword; and displaying a privacy report associated with the keyword in the UI.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim. Likewise, reference to "the invention" shall not be construed as a generalization of any inventive subject matter disclosed herein and shall not be considered to be an element or limitation of the appended claims except where explicitly recited in a claim.

Aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer-readable medium(s) having computer-readable program code embodied thereon.

Any combination of one or more computer-readable mediums may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples of a computer-readable storage medium include: an electrical connection having one or more wires, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the current context, a computer-readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for detecting privacy leaks, the method being performed by at least one computing device having at least one processor, the method comprising:
   receiving, at the computing device from a client device, a keyword;
   generating, by the computing device, a first query comprising the keyword;
   determining, by the computing device, at least one word representing a sensitive topic associated with the keyword;
   generating, by the computing device, a second query comprising the keyword logically combined with the at least one word;
   transmitting, from the computing device to a search engine, the first query and the second query;
   receiving, at the computing device from the search engine, a number of search results found by the search engine for the first query and the second query;
   determining, by the computing device, a confidence score for the keyword based on the number of search results for the first query and the second query, the confidence score indicating a probability that the keyword would leak information associated with the sensitive topic; and
   transmitting the confidence score from the computing device to the client device.

2. The method of claim 1, further comprising, when the confidence score meets or exceeds a predetermined threshold, performing a security action to prevent a leak of the information associated with the sensitive topic.

3. The method of claim 2, wherein the security action comprises transmitting, from the computing device to the client device, one or more of:
   an indication to remove the keyword from text entered into the client device;
   an indication to prevent the keyword from being entered into subsequent text on the client device; and
   an indication to display a warning about the keyword on the client device.

4. The method of claim 1, further comprising:
   determining, by the computing device based on a word hierarchy, a replacement word for the keyword; and
   transmitting, from the computing device to the client device, the replacement word.

5. The method of claim 4, wherein determining the replacement word comprises:
   identifying the keyword in the word hierarchy;
   locating a parent word of the keyword in the word hierarchy, the parent word being at a different level in the word hierarchy than the keyword; and
   selecting the parent word as the replacement word.

6. The method of claim 1, further comprising:
   prior to transmitting the first query and the second query to the search engine, determining, by the computing device, whether a cached results database includes a cached result for the first query.

7. The method of claim 6, further comprising:

transmitting the cached result for the first query from the computing device to the client device if the cached results database includes the cached result for the first query.

8. The method of claim 1, wherein receiving the keyword from the client device comprises receiving the keyword from a privacy leakage plug-in executing within an email client of the client device.

9. The method of claim 1, wherein the second query is generated to return search results from the search engine for the sensitive topic.

10. The method of claim 1, further comprising:
determining, by the computing device, at least one other word representing another sensitive topic associated with the keyword;
generating, by the computing device, a third query comprising the keyword logically combined with the at least one other word;
transmitting, from the computing device to the search engine, the third query;
receiving, at the computing device from the search engine, a number of additional search results found by the search engine for the third query;
determining, by the computing device, an additional confidence score for the keyword based on the number of additional search results for the third query, the additional confidence score indicating a probability that the keyword would leak information associated with the other sensitive topic;
ranking, by the computing device, the confidence scores to generate a tuple of relevant topics; and
transmitting the tuple of relevant topics from the computing device to the client device.

11. A computing device comprising:
a processor; and
a memory coupled to the processor and having instructions stored thereon which, when executed by the processor, perform operations for detecting privacy leaks, the operations comprising:
receiving, at the computing device from a client device, a keyword;
generating, by the computing device, a first query comprising the keyword;
determining, by the computing device, at least one word representing a sensitive topic associated with the keyword;
generating, by the computing device, a second query comprising the keyword logically combined with the at least one word;
transmitting, from the computing device to a search engine, the first query and the second query;
receiving, at the computing device from the search engine, a number of search results found by the search engine for the first query and the second query;
determining, by the computing device, a confidence score for the keyword based on the number of search results for the first query and the second query, the confidence score indicating a probability that the keyword would leak information associated with the sensitive topic; and
transmitting the confidence score from the computing device to the client device.

12. The computing device of claim 11, wherein the operations further comprise, if the confidence score meets or exceeds a predetermined threshold, performing a security action to prevent a leak of the information associated with the sensitive topic.

13. The computing device of claim 11, wherein the operations further comprise:
determining, by the computing device based on a word hierarchy, a replacement word for the keyword; and
transmitting, from the computing device to the client device, the replacement word.

14. A method for displaying privacy leak information, the method being performed by at least one computing device having at least one processor, the method comprising:
displaying, on a display device of the computing device, a user interface (UI) capable of receiving text from an input device associated with the computing device;
receiving, through the UI, text including a plurality of words;
identifying, by the computing device, a keyword among the plurality of words;
transmitting, from the computing device to a server, the keyword;
receiving, at the computing device from the server, a confidence score associated with the keyword and a replacement word for the keyword; and
updating the UI to include the confidence score and the replacement word.

15. The method of claim 14, wherein:
the confidence score indicates a first probability that the keyword would leak information for a sensitive topic associated with the keyword; and
a second probability that the replacement word would leak information for the sensitive topic associated with the keyword is less than the first probability.

16. The method of claim 15, wherein:
the method further comprises, when the confidence score meets or exceeds a predetermined threshold, performing a security action to prevent a leak of the information associated with the sensitive topic; and
the security action comprises one or more of:
removing the keyword from the text;
preventing the keyword from being entered into subsequent text; and
displaying a warning about the keyword.

17. The method of claim 14, further comprising:
receiving, through the UI, a selection of the replacement word; and
replacing, in the UI, the keyword with the replacement word in the text.

18. The method of claim 14, further comprising displaying, in the UI, an indication that the keyword potentially leaks sensitive information.

19. The method of claim 18, wherein the indication that the keyword potentially leaks sensitive information includes a color-coding of the keyword in the UI.

20. The method of claim 14, further comprising:
prior to updating the UI to include the confidence score and the replacement word, receiving a selection of the keyword; and
displaying a privacy report associated with the selected keyword in the UI.

* * * * *